(12) United States Patent
Straub

(10) Patent No.: US 7,533,718 B2
(45) Date of Patent: May 19, 2009

(54) AIR CONDITIONING DEVICE AND METHOD

(75) Inventor: Wolfgang Straub, Deggingen (DE)

(73) Assignee: Daimler AG, Stuttgart (DE)

( * ) Notice: Subject to any disclaimer, the term of this patent is extended or adjusted under 35 U.S.C. 154(b) by 397 days.

(21) Appl. No.: 10/556,047

(22) PCT Filed: Mar. 27, 2004

(86) PCT No.: PCT/EP2004/003284
§ 371 (c)(1),
(2), (4) Date: Dec. 7, 2006

(87) PCT Pub. No.: WO2004/098923
PCT Pub. Date: Nov. 18, 2004

(65) Prior Publication Data
US 2007/0163771 A1    Jul. 19, 2007

(30) Foreign Application Priority Data
May 9, 2003    (DE) ................................ 103 20 744

(51) Int. Cl.
*B60H 1/00* (2006.01)
(52) U.S. Cl. ............................ 165/202; 165/42; 165/43; 236/51; 236/91 C; 701/36; 701/208; 701/213
(58) Field of Classification Search ................. 165/202, 165/42, 43; 236/91 C, 51, 49.3; 701/36, 701/213, 208
See application file for complete search history.

(56) References Cited
U.S. PATENT DOCUMENTS
4,852,363 A * 8/1989 Kampf et al. ................ 165/202

(Continued)

FOREIGN PATENT DOCUMENTS
DE    196 19 643 C1    7/1997

(Continued)

OTHER PUBLICATIONS

PCT/Supplementary Sheet/237 (English translation) (One (1) page).

(Continued)

*Primary Examiner*—John K Ford
(74) *Attorney, Agent, or Firm*—Crowell & Moring LLP

(57) ABSTRACT

An air-conditioning device and an air conditioning method make it possible to reduce the problem that, on entry in a tunnel with a warm internal temperature, in the case of otherwise cold outside temperatures as a result of which, inter alia, the vehicle windowpanes and exterior mirror surfaces are cooled, this cold windowpane and exterior mirror surfaces, the surface temperature of which is lower than the dew-point temperature of the warm air in the tunnel interior, immediately fog up, since the absolute humidity on the surface then corresponds to more than 100% relative humidity. The air-conditioning device according to the invention and the air-conditioning method according to the invention use data supplied by already existing sensors and relating to the ambient weather, for example temperature data from an outside temperature sensor and moisture data from a dew-point sensor, in order to detect weather which is critical to this fogging. When critical weather is detected and a tunnel entry is detected, the vehicle windowpanes and exterior mirror surfaces are then fully automatically heated and/or the windshield wipers are actuated for a predetermined period of time.

5 Claims, 2 Drawing Sheets

U.S. PATENT DOCUMENTS

| | | | | |
|---|---|---|---|---|
| 5,516,041 | A | * | 5/1996 | Davis et al. ............... 236/91 C |
| 5,553,661 | A | * | 9/1996 | Beyerlein et al. ............. 165/43 |
| 5,992,162 | A | * | 11/1999 | Heinle et al. .................... 62/90 |
| 6,108,602 | A | * | 8/2000 | Bairamis .................... 701/208 |
| 6,155,061 | A | * | 12/2000 | Davis et al. ............... 236/91 C |
| 6,189,325 | B1 | * | 2/2001 | Pittion et al. ................. 62/133 |
| 6,298,911 | B1 | * | 10/2001 | Volz et al. ................... 165/202 |
| 2001/0007967 | A1 | * | 7/2001 | Yamamoto et al. .......... 701/208 |

FOREIGN PATENT DOCUMENTS

| | | |
|---|---|---|
| DE | 197 23 858 A1 | 12/1998 |
| DE | 197 44 414 C2 | 12/2000 |
| EP | 1 080 955 A1 | 3/2001 |
| JP | 11351721 A * | 12/1999 |
| JP | 2002029246 A * | 1/2002 |

OTHER PUBLICATIONS

EP Search Report dated Jul. 8, 2004.

German Office Action dated Nov. 26, 2003.

* cited by examiner

AIR CONDITIONING DEVICE AND METHOD

This invention relates to an air-conditioning device and an air-conditioning method.

There has been a problem, when motor vehicles drive into a long tunnel, that, as soon as there is warmer and moister air in the tunnel than there is outside, a sudden fogging of the outsides of all the windowpanes and exterior mirrors occurs shortly after the tunnel has been entered. The vehicle user has hitherto had to live with this physical problem. By the windshield wiper being switched on, at least a free view forward can be restored. When the panes and mirrors have subsequently assumed the higher temperature of the tunnel interior, the fogging disappears by itself. Owing to the significant sight impairment shortly after the tunnel has been entered, however, there is an increased risk of accidents at this particular moment.

There is no regulating action taken by a known air-conditioning device or a known air-conditioning method.

A vehicle air-conditioning system with a plurality of operating states capable of being set by an associated control unit is known from German document DE-197 44 414 C2. The control unit in this case automatically sets the respective operating state of the motor vehicle air-conditioning system as a function of a predeterminable desired operating area in the form of a region or a country or as a function of the region or country in which the vehicle is located at that particular moment. The control unit in this case sets specific temperature desired values, which directly or indirectly describe the sought-after climate of the motor vehicle occupant space, and/or specific power parameters of the motor vehicle air-conditioning system, such as, for example, respective powers of the air blower, of the refrigerating machine and of the heating means, in accordance with the comfortable climate feeling of the respective population of these countries or regions. The current operating area is determined by the control unit in response to GPS signals received from a navigation system by means of a sensor.

However, even with this air-conditioning device, there is no evaluation of GPS. data as to whether the vehicle is possibly driving into a tunnel and predetermined exterior conditions leading to the fogging problems outlined above are fulfilled.

The object of the present invention is, therefore, to develop an air-conditioning device and an air-conditioning method in such a way that the problem outlined above is avoided.

This object is achieved by means of an air-conditioning device and an air-conditioning method according to the invention. The dependent claims specify advantageous developments of the invention.

In the air-conditioning device according to the invention and in the associated air-conditioning method, all or individual windowpane heating means and the electrical exterior mirror heatings and/or existing windshield wipers are switched on fully automatically a predetermined period of time before entry into the tunnel as a function of navigation data for early tunnel detection and of critical weather conditions detected by climate sensor means, in which the above-mentioned problem may arise.

In this way, then, the problem of a fogging of the outsides of the windowpanes and of the exterior mirrors with warm moist internal air when a tunnel is entered can be mitigated, even though it cannot be eliminated completely in physical terms. As a result, the risk of accidents due to restricted viewing conditions suddenly occurring on account of fogging in the event of a cold outside air temperature, that is to say cold windowpanes, and a warm internal tunnel temperature can be reduced, at least when heatable windowpanes and/or mirrors are present.

These and further objects, features and advantages of the present invention become obvious from the following detailed description of the preferred exemplary embodiment of the invention described below in conjunction with the drawings.

DETAILED DESCRIPTION OF THE INVENTION

Figure 1:
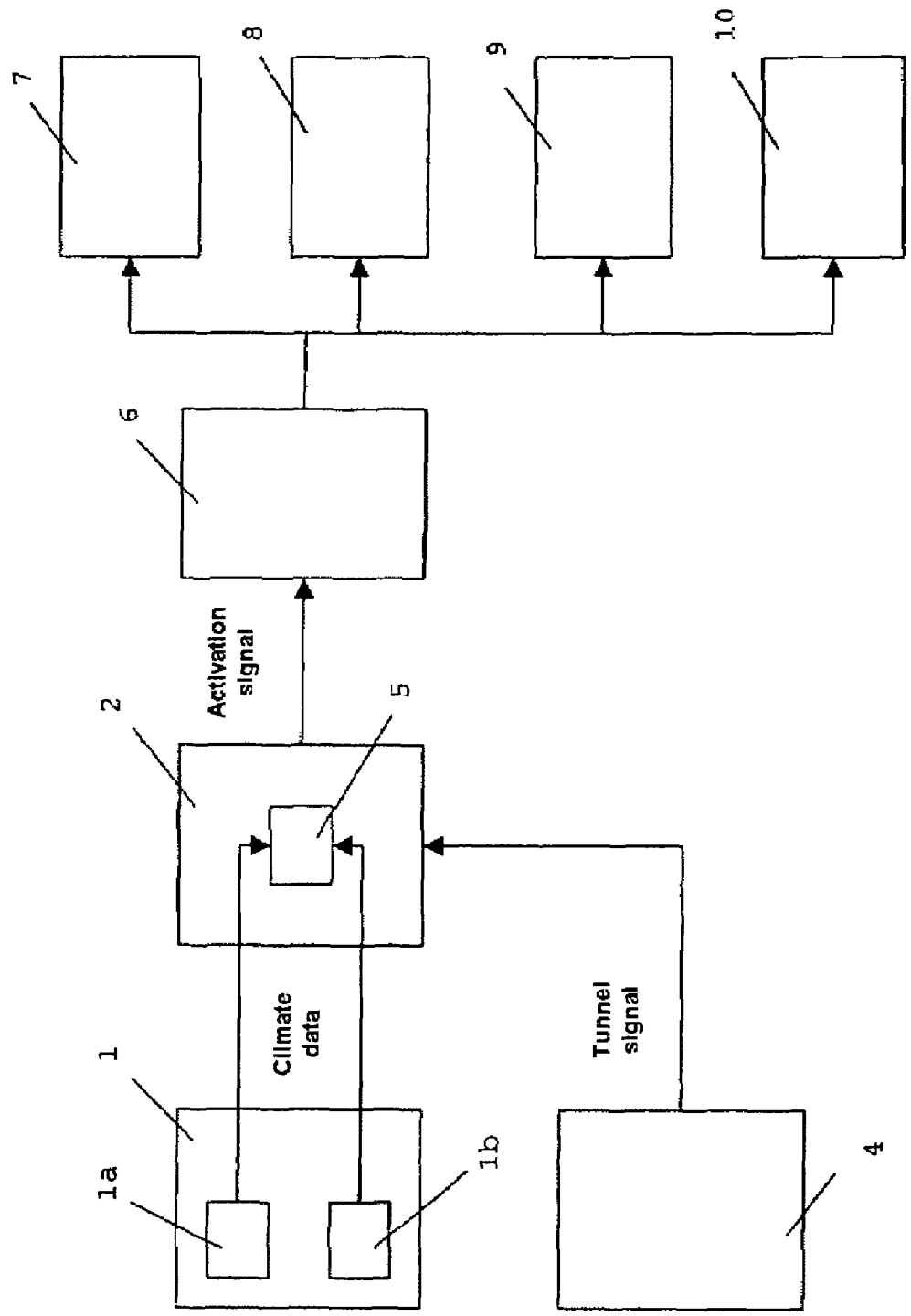
FIG. 1 shows a block diagram of an air-conditioning device according to the invention.

A preferred exemplary embodiment of the air-conditioning device according to the invention and of the air-conditioning method according to the invention is described in more detail below with reference to the drawings.

The air-conditioning device according to the invention has conventional climate sensor means 1, for example with an outside temperature sensor 1a and a dew-point sensor 1b, by means of which the outside temperature and the dew-point are detected and transmitted to an evaluation means 2. Furthermore, in the air-conditioning device according to the invention, a connection to a navigation means 4 is made, by which the navigation means communicates a tunnel signal a predetermined period of time before the arrival of a tunnel, so that the arrival of a tunnel can be detected in due time. According to the invention, the evaluation means 2 has a comparison means 5 which is activated only when the tunnel signal is communicated by the navigation means 4. The comparison means then carries out a comparison of data detected by the climate sensor means 1 and relating to outside temperature and dew-point, by means of which comparison it is determined whether the detected outside temperature is lower than the detected dew-point temperature in the tunnel interior. If this is so, the evaluation means 2 outputs an activation signal to a control means 6 which then switches on existing windowpane heatings 7, exterior mirror heatings 8 and, if appropriate, also existing windshield wipers 9 and switches them off again after a predetermined time.

The control means 6 is likewise also designed for a conventional activation of air-conditioning means 10 for the vehicle interior. Moreover, by virtue of the above-described activation of the windowpane heatings 7, of the exterior mirror heatings 8 and of the windshield wipers 9 in order to avoid fogging, it is necessary to vary or adapt the activation of the air-conditioning means 10 for the vehicle interior, in order to raise the windowpane temperature to a value higher than the dew-point temperature of the ambient air in the tunnel which would be detrimental to air-conditioning comfort in the vehicle interior. Moreover, the user of the vehicle is relieved of having to act, since the activation of the windshield wipers 9 takes place without manual operating action, without a rain sensor possibly present having detected the fogging and activated the windshield wiper or without the user actuating the windshield wiper manually.

Figure 2:
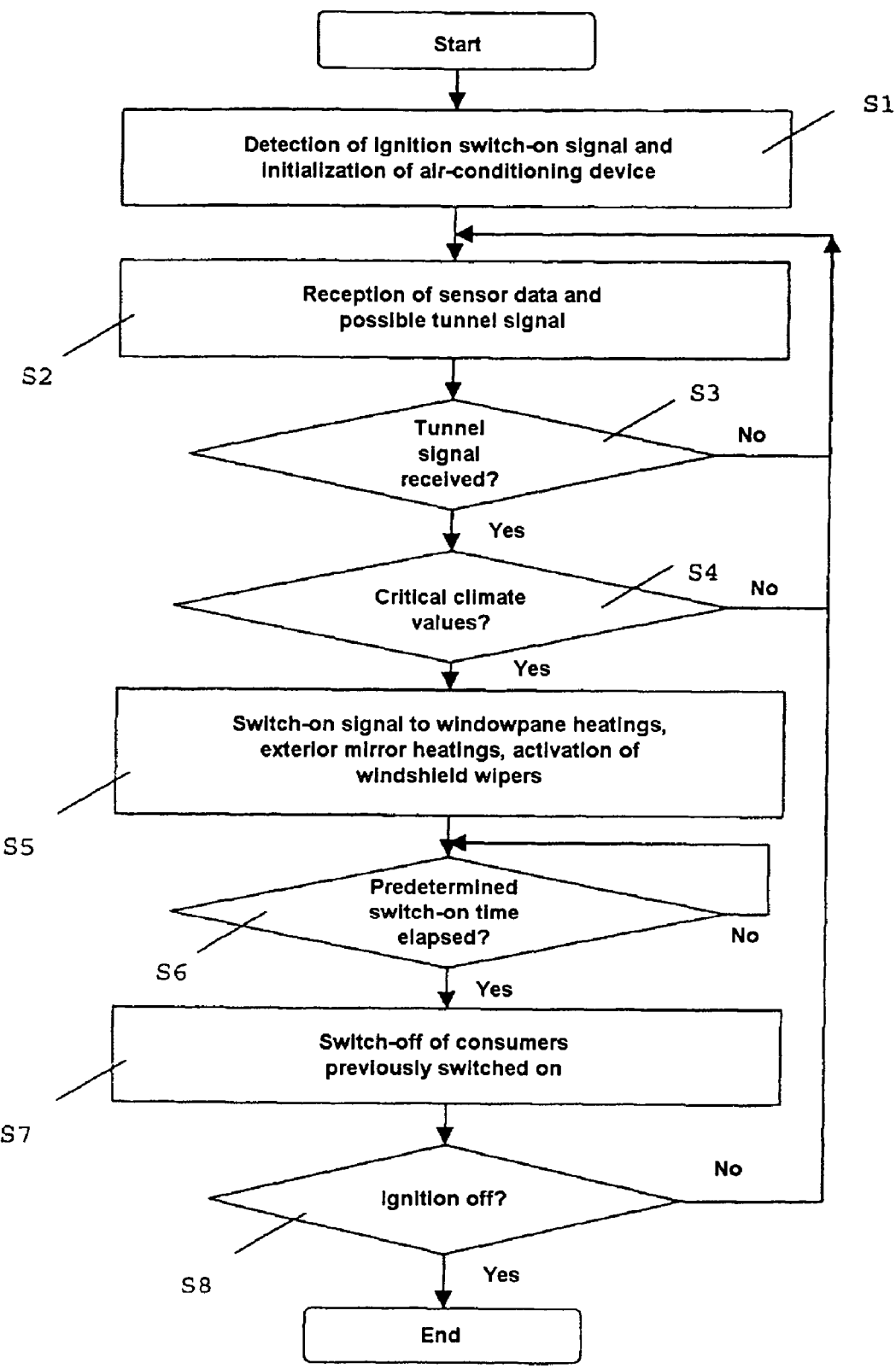
FIG. 2 shows a flowchart of the air-conditioning method according to the invention.

The air-conditioning method according to the invention is described in more detail below with reference to the flowchart in FIG. 2.

In a first step S1, an ignition switch-on signal output when an ignition is switched on is detected, and, in the presence of an ignition switch-on signal, an initialization signal is sent to an air-conditioning device, whereupon the latter is initialized.

Subsequently, in a second step, S2, sensor data from climate sensor means 1 contained in the air-conditioning device are received by the evaluation means 2. Moreover, the evaluation means, if appropriate, receives a tunnel signal from a navigation means 4 when the navigation means 4 detects, from a comparison for GPS data received by it and the card data for the location determined from these, that a tunnel is arriving.

As soon as this information has been received in step S2, a control means of the air-conditioning device checks, in step S3, whether a tunnel signal has been received. If no tunnel signal has been received, the flow returns to step S2. If, however, a tunnel signal has been received, a check is made, in step S4, whether the climate data obtained by the climate sensor means 1 have values critical for the occurrence of fogging. If no critical values are present, the flow returns to step S2. If, however, the presence of critical values is detected, that is to say if, in step S4, it is decided that there is the risk of fogging in the tunnel, the flow passes onto step S5.

In step S5, the activation means sends switch-on signals to existing electrical windowpane heatings, for example for front, rear and/or side windowpanes, exterior mirror heatings, for example for the right and/or left exterior mirror, so that an activation of these means can take place in due time before tunnel entry. An activation of the windshield wiper takes place only after a tunnel entry, since only then can a fogging of the windowpanes take place.

In step S6, a check is subsequently made as to whether either a predetermined time which is always sufficient for the windowpanes to reach a sufficient temperature or a time defined by the activation means in response to the difference between windowpane temperature and dew-point has elapsed. If this is so, a switch-off of all the consumers previously switched on takes place in step S7, otherwise there is a return to step S5.

As long as there is no detection that the ignition has been switched off, steps S2 to S7 are repeated. When the ignition is switched off, the flow is terminated.

The invention claimed is:

1. An air-conditioning device in a vehicle, comprising:
    climate sensor means for detection of outside temperature and dew-point,
    a control means for activation of air-conditioning means for a vehicle interior, and
    a navigation means for determining a vehicle position,
    wherein the control means is designed additionally for the activation of windowpane heating, exterior mirror heating, and a windshield wiper, and
    the navigation means sends a tunnel signal to an evaluation means at a predetermined time before arrival of a tunnel,
    wherein the evaluation means, to which data detected by the climate sensor means and relating to outside temperature and dew-point are communicated, has a comparison means which, in response to the tunnel signal from the navigation means, determines whether a detected outside temperature is lower than a detected dew-point temperature in the tunnel interior and, if so, outputs an information signal to the control means, and
    wherein the control means is designed in such a way that it switches on, directly upon tunnel entry, at least one of the windowpane heating, the exterior mirror heating, and the windshield wiper if the information signal from the comparison means informs it that the outside temperature is lower than the dew-point temperature in the tunnel interior and switches them off again at a predetermined time.

2. The device as claimed in claim 1, wherein the predetermined time is selected such that it is sufficient for a windowpane and an exterior mirror to reach a sufficient temperature.

3. The device as claimed in claim 1, wherein the predetermined time is determined as a function of a windowpane temperature and a dew-point.

4. An air-conditioning method for a vehicle, comprising:
    (S1) initializing an air-conditioning device in response to a detected ignition switch-on signal,
    (S2) receiving climate data from climate sensor means and receiving a possible tunnel signal from a navigation means,
    (S3) checking as to whether a tunnel signal has been received and, if no tunnel signal has been received, returning to (S2),
    (S4) checking as to whether the climate data has predetermined values critical for occurrence of fogging and that there is the risk of fogging in a tunnel and, if the climate data have no critical values, returning to (S2),
    (S5) sending consumer switch-on signals to existing windowpane heatings and exterior mirror heatings at a predetermined time before tunnel entry, and activating a windshield wiper directly after tunnel entry,
    (S6) checking as to whether a predetermined time, after which the windowpanes have always reached a sufficient temperature, has elapsed,
    (S7) switching off all consumers previously switched on if it is determined that the predetermined time has elapsed, and otherwise returning to (S5), and
    (S8) repeating (S2) to (S7) as long as an ignition switch-off is not detected.

5. The air-conditioning method as claimed in claim 4, wherein a difference between a windowpane temperature and the dew-point is determined from the climate data and, in response, a switch-on time for the windowpane heatings and exterior mirror heatings is determined, and, in (S6), determining whether the predetermined time has elapsed.

* * * * *